(12) United States Patent
Thompson et al.

(10) Patent No.: US 7,791,045 B2
(45) Date of Patent: Sep. 7, 2010

(54) APPARATUS AND METHOD FOR DETECTING SLOW NEUTRONS BY LYMAN ALPHA RADIATION

(75) Inventors: Alan Keith Thompson, Riverdale, MD (US); Charles W. Clark, Wheaton, MD (US); Michael A. Coplan, Chevy Chase, MD (US)

(73) Assignee: The United States of America as represented by the Secretary of the Commerce, the National Institute of Standards and Technology, Washington, DC (US)

( * ) Notice: Subject to any disclaimer, the term of this patent is extended or adjusted under 35 U.S.C. 154(b) by 0 days.

(21) Appl. No.: 12/181,711

(22) Filed: Jul. 29, 2008

(65) Prior Publication Data

US 2009/0114843 A1 May 7, 2009

Related U.S. Application Data

(60) Provisional application No. 60/956,943, filed on Aug. 21, 2007.

(51) Int. Cl.
*G01T 1/04* (2006.01)
*G01T 1/00* (2006.01)
(52) U.S. Cl. .................. 250/473.1; 250/483.1
(58) Field of Classification Search ............... 250/473.1, 250/483.1, 390.01
See application file for complete search history.

(56) References Cited

U.S. PATENT DOCUMENTS

| | | | | |
|---|---|---|---|---|
| 4,286,158 | A | * 8/1981 | Charpak et al. | 250/374 |
| 5,519,226 | A | 5/1996 | Copeland et al. | 250/390.11 |
| 2005/0269501 | A1* | 12/2005 | Esin et al. | 250/282 |
| 2007/0132408 | A1* | 6/2007 | Salvemoser et al. | 315/326 |

OTHER PUBLICATIONS

Daniel Nicholas McKinsey; Detection of Magnetically Trapped Neutrons: Liquid Helium as a Scintillator; Thesis, The Department of Physics; Harvard University, Cambridge, Massachusetts, Feb. 2002.

* cited by examiner

*Primary Examiner*—David P Porta
*Assistant Examiner*—Faye Boosalis
(74) *Attorney, Agent, or Firm*—Kermit D. Lopez; Melissa L. Asfahani; Luis M. Ortiz

(57) ABSTRACT

A method and apparatus for detecting slow neutrons by monitoring Lyman alpha radiation produced by the $^3$He(n,tp) nuclear reaction induced by neutrons incident on a gas cell containing $^3$He or a mixture of $^3$He and other atoms and/or molecules. Such a method and/or apparatus includes the use of, for example, liquid $^3$He and $^4$He mixtures as a scintillation counter for the sensitive detection of neutrons using Lyman alpha radiation produced by the $^3$He(n,tp) reaction. The radiation can be detected with high efficiency with an appropriate photo-detector, or alternatively, it can be converted to radiation at longer wavelength by absorption in scintillation materials, with the radiation channeled to a photodetector. Because of the simplicity of the system and the fact that the radiation production mechanisms can be measured and/or calculated independently, the method and/or apparatus also has the potential for service as a calculable absolute detector.

18 Claims, 3 Drawing Sheets

APPARATUS AND METHOD FOR DETECTING SLOW NEUTRONS BY LYMAN ALPHA RADIATION

CROSS-REFERENCE TO PROVISIONAL APPLICATION

This patent application claims priority under 35 U.S.C. §119(e) to provisional patent application Ser. No. 60/956,943, entitled "Far Ultraviolet Dosimeter for Slow Neutron Detection," which was filed on Aug. 21, 2007, the disclosure of which is incorporated herein by reference.

TECHNICAL FIELD

Embodiments are generally related to neutron detecting devices and methodologies. Embodiments are also related to detection of single neutrons, high spatial resolution position sensitive detection of neutrons, and thermal neutron imaging. Embodiments are additionally related to neutron detecting sensors and components thereof. Embodiments are specifically related to the detection of slow neutrons.

BACKGROUND OF THE INVENTION

The two most routinely used thermal neutron detectors, the fission detector and proportional Geiger mode detector, are based on technologies that are more than 30 years old. The fission detector is based on the reaction of thermal neutrons with fissionable material (generally isotopes of uranium or plutonium) with the high energy reaction products detected with conventional solid state particle detectors. The proportional detector is based on the reaction of neutrons with either $^3$He or $BF_3$. Fission detectors have low sensitivity, limited dynamic range and sensitivities are not stable with use.

The majority of neutron detectors in use today are either $BF_3$ or $^3$He gas proportional tubes. $^3$He and $BF_3$ detectors have efficiencies similar to the proposed new technique, but require high voltages (1300 V to 2000 V), are susceptible to microphonics and have a dead time of approximately 1 μs limiting their maximum counting rate. The tubes also require an ultra-pure quench gas to achieve sufficient signal-to-noise ratios and suffer from wall effects when particle energy is lost by absorption at the tube walls. In addition, $BF_3$ is a toxic and corrosive gas. While there are many instruments that employ $BF_3$ in the field, manufacturers are moving away from its use.

There are a small number of detectors using a lithium doped scintillator (e.g., lithium glass, lithium iodide, or lithium-loaded plastic). The utility of such devices is limited by gamma ray backgrounds. A need, therefore, exists for an improved method and/or apparatus for neutron detection that has high sensitivity, wide dynamic range, stability and the capability of being calibrated absolutely. The disclosed embodiments have these advantages.

The disclosed embodiments involve phenomena of nuclear physics and of atomic, molecular and optical (AMO) physics, associated with atomic electron excitation as a result of the $^3$He(n,tp) reaction. This reaction generates a quantity of Lyman alpha radiation that is easily detectable in $^3$He gas targets. Lyman alpha radiation, at a wavelength of approximately 122 nm in the far-ultraviolet region of the electromagnetic spectrum, is produced by the 2p-1s optical transition in atomic hydrogen isotopes. Such radiation serves as a useful signature for precise neutron dosimetry, leading to single-neutron detection capabilities and compact neutron detectors that can operate over a wide dynamic range without high voltages. Backgrounds from gamma radiation are very low.

The $^3$He(n,tp) reaction has long been studied in nuclear physics and now is the basis of most thermal neutron detectors used at the National Institute of Standards and Technology (NIST). The small uncertainty in the reaction cross section (0.12%) suggests this reaction as a candidate for the primary standard detector for accurate determination of thermal neutron fluence, but the operational uncertainty of $^3$He proportional tubes is more than an order of magnitude larger than the uncertainty in the cross section. The disclosed embodiments provide a method for substantially reducing the operational uncertainty of a neutron detector based on the $^3$He(n,tp) reaction.

The $^3$He(n,tp) reaction is exothermic at zero incident neutron energy, where it yields (from the nuclear perspective alone) a triton and a proton with combined escape energy of 764 keV. The reaction yields, with unknown branching ratios, hydrogen atoms (H), tritium atoms (T) protons (p), and tritons (t) in a number of final state configurations, including the 2p excited states of hydrogen and tritium, respectively H(2p) and T(2p).

In an ambient environment of $^3$He gas, Lyman alpha radiation is generated by the following mechanisms: H(2p) and/or T(2p) produced in the initial reaction; higher excited states of H and/or T produced in the initial reaction, followed by radiative or collisional relaxation to 2p states; ground states of H and/or T from the initial reaction followed by subsequent collisions with $^3$He to produce H(2p) and/or T (2p); and direct production of protons and tritons followed by charge exchange collisions with $^3$He, leading to both ground and excited states of H and T that then undergo subsequent collisions resulting in H(2p) and/or T(2p). The local $^3$He environment is transparent to Lyman alpha radiation, which thus allows for its efficient detection by optical techniques. In addition, radiation at the Lyman alpha wavelength is produced by a transition between two excited states of the He$^+$ ion.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire abstract specifications, claims, and drawings, as a whole.

It is, therefore, one aspect of the present invention to provide for an improved neutron detector apparatus.

It is another aspect of the present invention to provide for a neutron detector apparatus that uses Lyman alpha radiation in the far-ultraviolet region of the electromagnetic spectrum as a signature of the $^3$He(n,tp) reaction.

The aforementioned aspects of the invention and other objectives and advantages can now be achieved as described herein. A method and system is disclosed for detecting slow neutrons by monitoring Lyman alpha radiation produced by a $^3$He(n,tp) nuclear reaction induced by neutrons incident on a gas cell containing $^3$He with or without other gases.

Lyman alpha radiation is produced with high efficiency when a $^3$He cell is irradiated with neutrons. Several mechanisms contribute to Lyman alpha production, as described herein. When the gas cell contains only helium atoms, Lyman alpha radiation is spectrally isolated and the gas medium is transparent to it. The Lyman alpha radiation can be detected with high efficiency using a photo-detector sensitive to Lyman alpha radiation, or alternatively it can be converted to visible radiation by scintillator materials, with the visible radiation channeled to a suitable photo-detector.

The disclosed embodiments have the potential for service as a calculable absolute detector because of the simplicity of this principle of neutron detection and the fact that the rates of many of the underlying atomic collision processes can be measured and/or calculated independently.

The disclosed embodiments include the use of a liquid form of $^3$He and other substances as a scintillation counter for ultrasensitive detection of neutrons using Lyman alpha produced by the $^3$He(n,tp) reaction. The same basic mechanisms are operable in liquid $^3$He as in gas phase $^3$He and the much higher densities of the liquid can amplify the Lyman alpha signal via repeated collisions of reaction-product H atoms and T atoms with liquid $^3$He atoms. The transparency of liquid helium to Lyman alpha radiation is well established.

The disclosed embodiments additionally can find use in the context of efficient neutron detectors as personal protective equipment for civilian first responder and military personnel due to the efficiency of the detection scheme and its ability to operate without high voltages. The embodiments can also find use in automated screening of cargo, to detect nuclear materials, and for monitoring nuclear reactor operations.

The embodiments disclosed herein have the potential to increase the accuracy of primary neutron dosimetry, which would benefit efforts on neutron standards and the determination of the neutron lifetime and measurement of the neutron magnetic and electric dipole moments.

In accordance with features of the present invention, a slow neutron detecting apparatus is disclosed comprising a cell containing a substance exposed to a source of neutrons, a detector device for monitoring far ultraviolet radiation emitted from the cell, wherein a detection of far ultraviolet radiation by the detector is indicative of a presence of slow neutrons, and an interface associated with the cell and the detector, wherein an interface converts the detection of far ultraviolet radiation into a measure of slow neutron fluence. The substance in the cell can be $^3$He in gas or liquid form; a mixture of $^3$He and a gas; and a mixture of $^3$He and a liquid. The far ultraviolet radiation comprises a Lyman alpha radiation at a wavelength of approximately 122 nanometers.

In accordance with a method of using the present invention, slow neutrons react with $^3$He and the Lyman alpha radiation in a far ultraviolet region of an electromagnetic spectrum that is monitored by utilizing a detector device, wherein the detection of Lyman alpha radiation at a wavelength of approximately 122 nanometers by the detector is indicative of presence of slow neutrons. Slow neutrons can produce Lyman alpha radiation by a direct excitation of a 2p state of hydrogen and/or tritium in a course of a nuclear reaction with $^3$He, by a direct excitation of a 2p state of tritium in a course of a nuclear reaction with $^3$He, an electron capture to a 2p state of hydrogen and tritium, as a result of an electron transfer collisions of tritons and protons with $^3$He, an excitation via collisions of hydrogen and tritium atoms with $^3$He, a radiative recombination of electrons produced in a nuclear reaction with $^3$He, along subsequent ionization tracks with protons and tritons produced in nuclear reaction, and with He$^{2+}$ ions produced along said ionization tracks. A detector device comprises a far-ultraviolet radiation detector or a photo-detector that detects spectrally isolated Lyman alpha radiation that is converted to a visible radiation by absorption via a scintillator material layer. Slow neutrons produce said Lyman alpha radiation via a $^3$He(n,tp) nuclear reaction induced by neutrons incident on a cell that contains $^3$He gas, a mixture of $^3$He and at least one other collection of atoms or molecules in a gas or liquid form.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
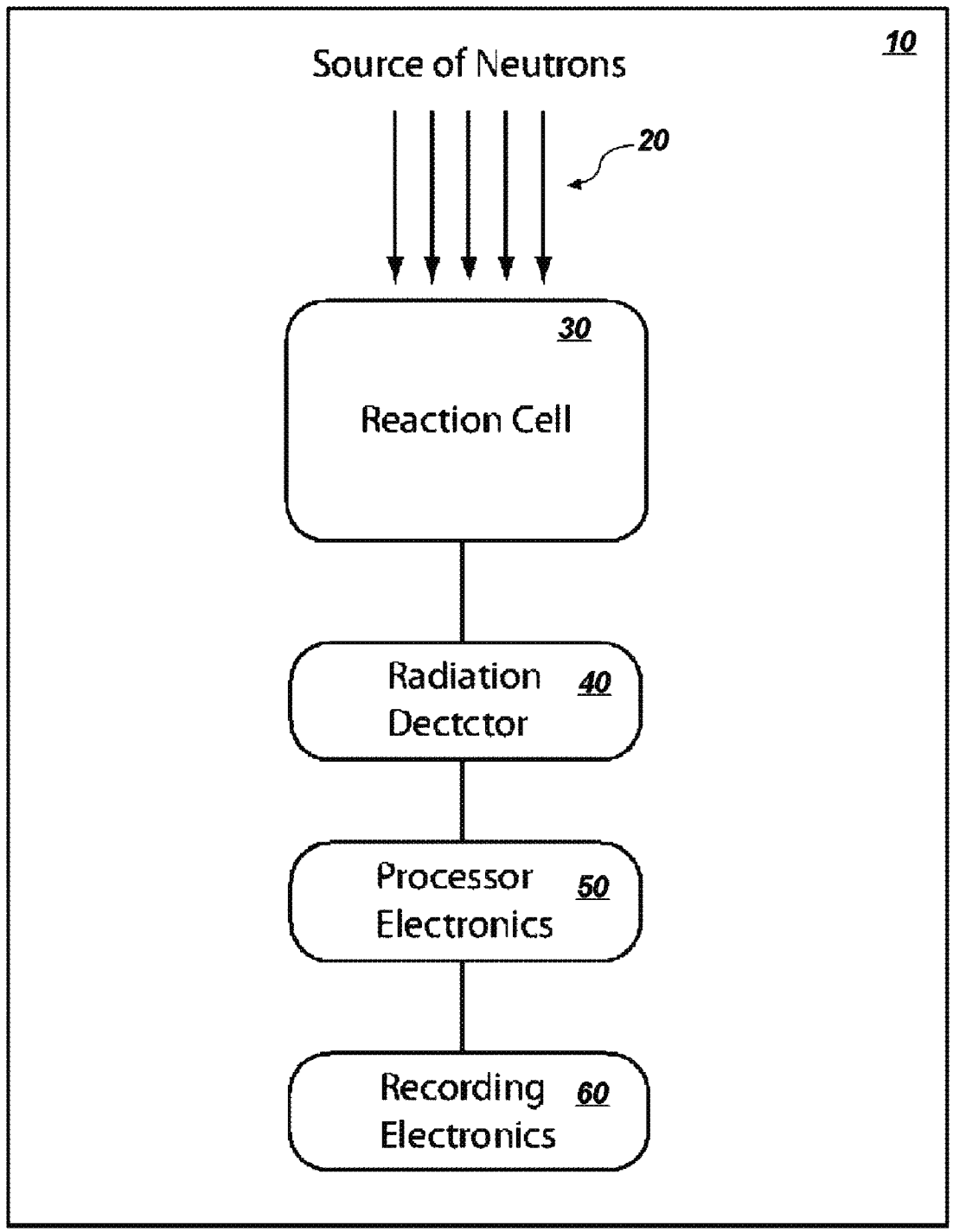
FIG. 1 schematically illustrates an embodiment of an apparatus, in accordance with a preferred embodiment.

FIG. 1 illustrates a diagram depicting an apparatus 10 in accordance with a preferred embodiment. FIG. 1 illustrates a detection apparatus 10 for detecting slow neutrons that comprises a neutron source 20, a reaction cell 30, a detector of far ultraviolet radiation 40, processor electronics 50, and recording electronics 60. The reaction cell 30 contains $^3$He in gas or liquid form with the possible addition of other gases or liquids exposed to a source of neutrons 20. The detection of far ultraviolet radiation at 122 nm is indicative of the presence of slow neutrons. The processor electronics 50 and the recording electronics 60 represent an interface for converting the detection of far ultraviolet radiation into a measure of slow neutron fluence via an electrical signal with or without conversion to light of other wavelengths.

The reaction cell 30 depicted in FIG. 1 generally contains $^3$He in the form of at least a gas or a liquid. Another option is that the reaction cell 30 can contain a mixture of $^3$He and other atoms or molecules in liquid or gas form.

Figure 2:
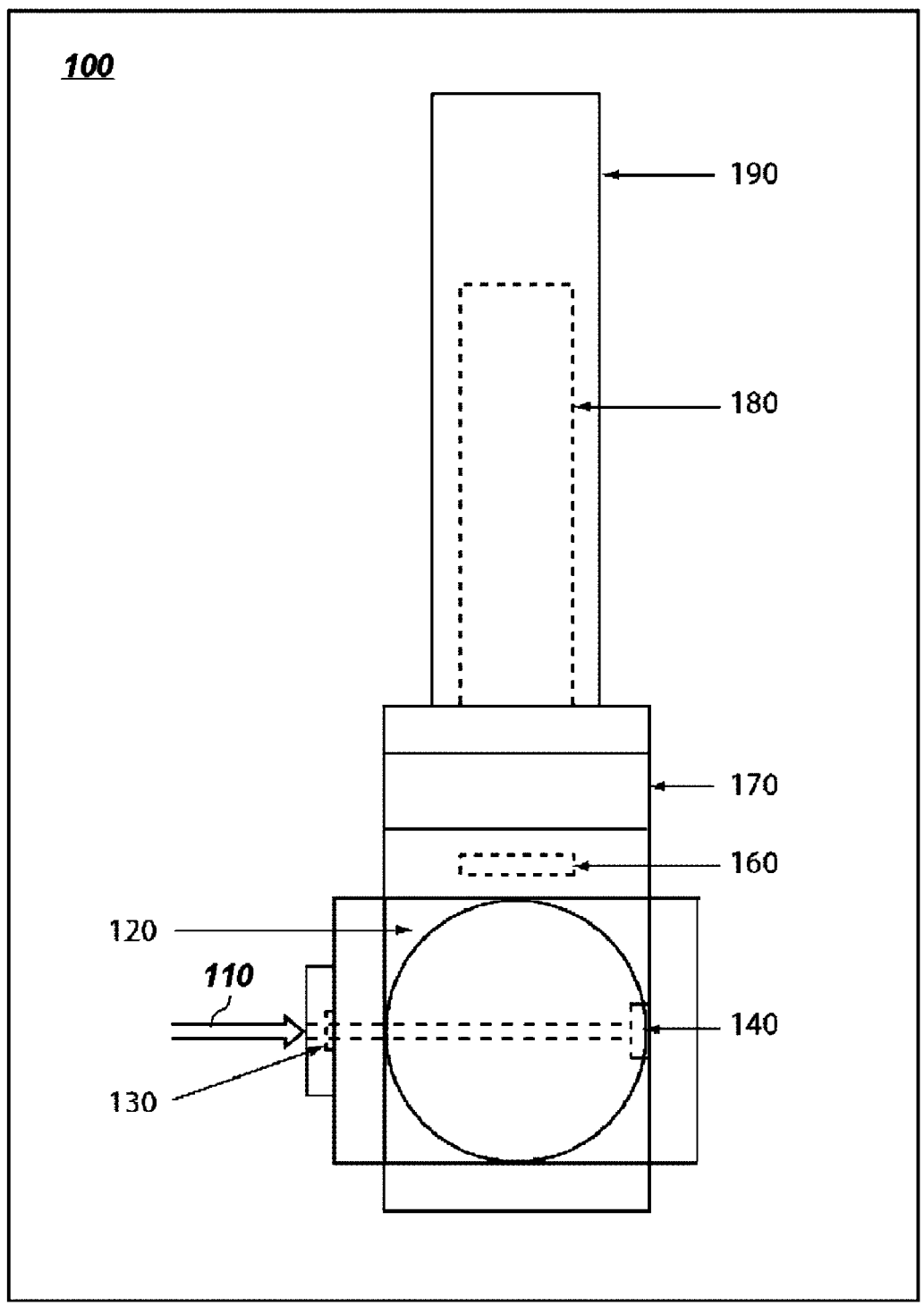
FIG. 2 schematically illustrates an apparatus, in accordance with an alternative embodiment.

FIG. 2 illustrates an apparatus 100 for detecting slow neutrons in accordance with an alternative embodiment. A beam of neutrons 110 enters the reaction cell 120 through a thin silicon window 130 attached to the face of the reaction cell 120. A lithium-impregnated plastic disk or other neutron absorbing material 140 at the end of the reaction cell 120 interior opposite the silicon window 130 acts as a beam dump, absorbing all un-reacted neutrons. Radiation is detected by a photomultiplier tube 180 mounted on the top of the cell behind an MgF$_2$ exit window 160.

An evacuated volume 170 between the MgF$_2$ window 160 and the photomultiplier tube 180 eliminates $^3$He from coming in contact with the face of the photomultiplier tube 180, diffusing into it and rendering it inoperative over time. Also shown is the photomultiplier housing 190.

Figure 3:
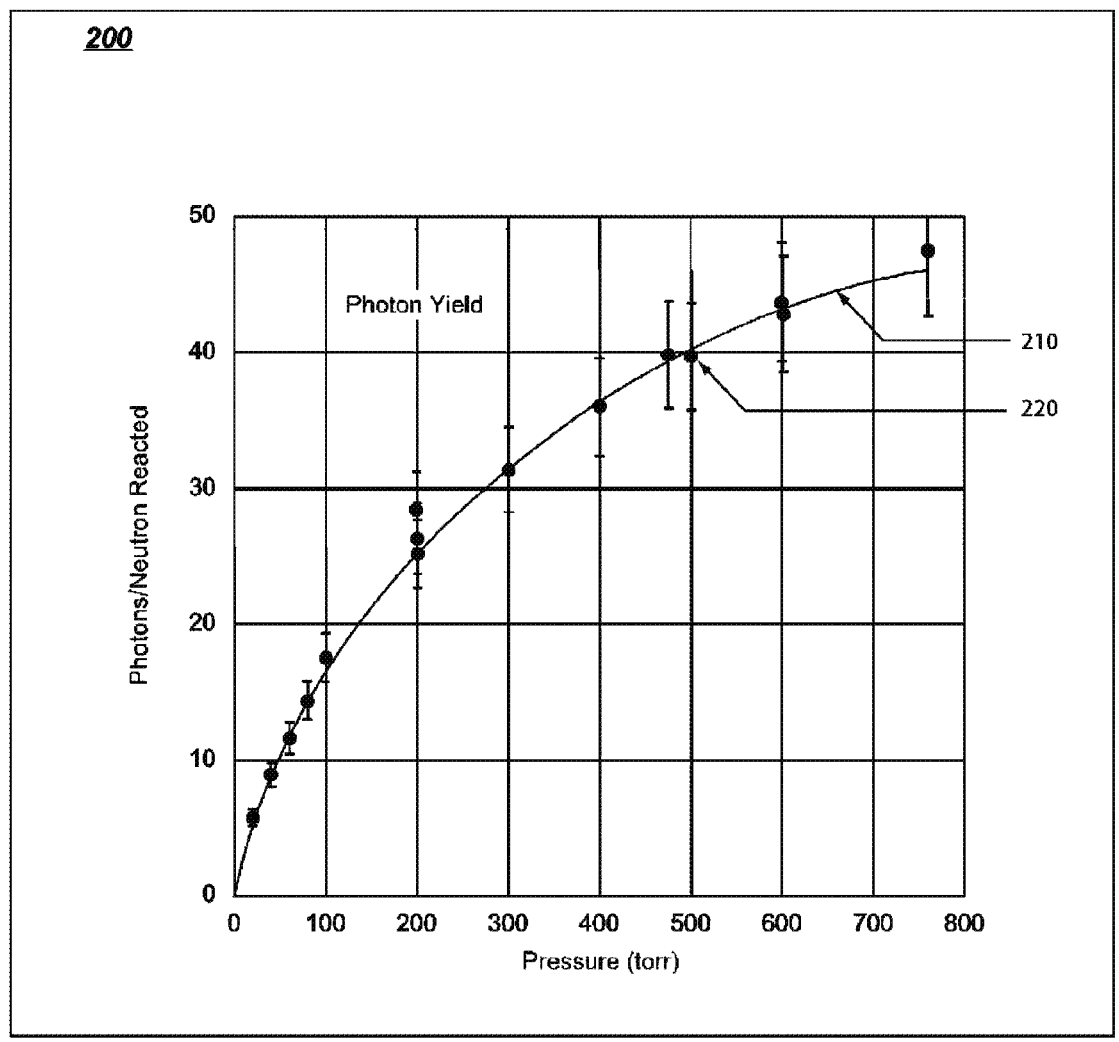
FIG. 3 illustrates the number of Lyman alpha photons per reacted neutron as a function of $^3$He pressure from the slow neutron detection apparatus depicted in FIG. 2, in accordance with an alternative embodiment.

FIG. 3 illustrates a graph 200 depicting Lyman alpha photons per reacted neutron 210 as a function of $^3$He pressure. The data was acquired with the slow neutron apparatus depicted in FIG. 2. In calculating the photon production rate, the solid angle of the detector was taken into consideration. The k=1 (68% confidence) uncertainties around the measured data points 220 reflect the statistical uncertainties of the measurements, the uncertainty in the calibration of the photomultiplier tube detector, but not the uncertainty in the collection efficiency of detector which is estimated to be of order 20%.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention, what is claimed is:

1. An apparatus for detecting slow neutrons, said apparatus comprising:
    at least one cell among a plurality of cells, said at least one cell containing a substance exposed to the slow neutrons wherein the slow neutrons cause the substance to emit ultraviolet radiation, comprising Lyman alpha radiation at a wavelength of approximately 122 nanometers, that is emitted from the at least one cell;
    at least one detector device monitoring the ultraviolet radiation and producing a detection of ultraviolet radiation; and
    an interface associated with said at least one cell and said at least one detector, wherein said interface converts the detection of ultraviolet radiation into a measure of slow neutron fluence.

2. The apparatus of claim 1 wherein said substance comprises $^3$He gas.

3. The apparatus of claim 1 wherein said substance comprises liquid $^3$He.

4. The apparatus of claim 1 wherein said substance contains a mixture of $^3$He and another gas.

5. The apparatus of claim 1 wherein said substance contains a mixture of $^3$He and another liquid.

6. An apparatus for detecting slow neutrons, said apparatus comprising:
    at least one cell among a plurality of cells, said at least one cell containing $^3$He gas exposed to a source of neutrons;
    at least one detector device for monitoring far ultraviolet radiation, comprising Lyman alpha radiation at a wavelength of approximately 122 nanometers, emitted from said at least one cell, wherein a detection of far ultraviolet radiation by said at least one detector is indicative of a presence of slow neutrons; and
    an interface associated with said at least one cell and said at least one detector, wherein said interface converts a said detection of far ultraviolet radiation into a measure of slow neutron fluence.

7. A method for detecting slow neutrons, said method comprising:
    reacting the slow neutrons with $^3$He to produce Lyman alpha radiation; and
    monitoring the Lyman alpha radiation in a far ultraviolet region of an electromagnetic spectrum, wherein a detection of Lyman alpha radiation at a wavelength of approximately 122 nanometers is indicative of a presence of slow neutrons.

8. The method of claim 7 wherein said slow neutrons produce said Lyman alpha radiation by a direct excitation of a 2p state of at least one of hydrogen and tritium in a course of a nuclear reaction with $^3$He.

9. The method of claim 7 wherein said neutrons produce said Lyman alpha radiation by an electron capture to a 2p state of at least one of hydrogen and tritium, as a result of an electron transfer collisions of tritons and protons with $^3$He.

10. The method of claim 7 wherein said slow neutrons produce said Lyman alpha radiation by an excitation via collisions of at least one of hydrogen and tritium atoms with $^3$He.

11. The method of claim 7 wherein said slow neutrons produce said Lyman alpha radiation by a radiative recombination of electrons with at least one of protons and tritons produced in said nuclear reaction and with He$^{2+}$ions.

12. The method of claim 7 wherein said at least one detector device comprises a far-ultraviolet radiation detector.

13. The method of claim 7 wherein said at least one detector comprises a photo-detector that detects spectrally isolated Lyman alpha radiation that is converted to a visible radiation by absorption via a scintillator material layer.

14. The method of claim 7 wherein said slow neutrons produce said Lyman alpha radiation via a $^3$He(n,tp) nuclear reaction induced by neutrons incident on at least one cell that contains $^3$He gas exposed to said slow neutrons.

15. The method of claim 14 wherein said at least one cell contains a mixture of $^3$He and at least one other collection of atoms in a gas form.

16. The method of claim 14 wherein said at least one cell contains a mixture of $^3$He and at least one other collection of atoms in a liquid form.

17. The method of claim 14 wherein said at least one cell contains a mixture of $^3$He and at least one other collection of molecules in a gas form.

18. The method of claim 14 wherein said at least one cell contains a mixture of $^3$He and at least one other collection of molecules in a liquid form.

* * * * *